Oct. 4, 1966 C. W. HAHN 3,276,131
LINEAR MEASURING DEVICE
Filed April 9, 1965 2 Sheets-Sheet 1
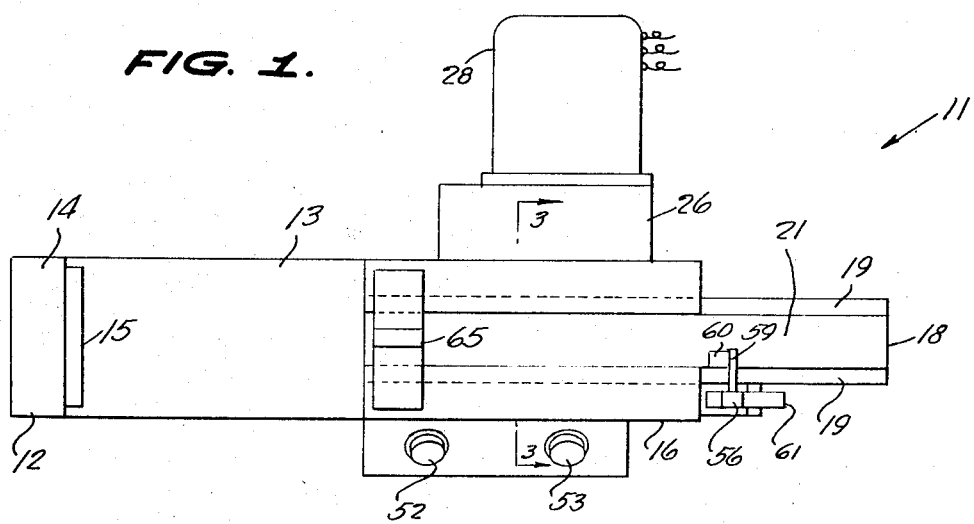
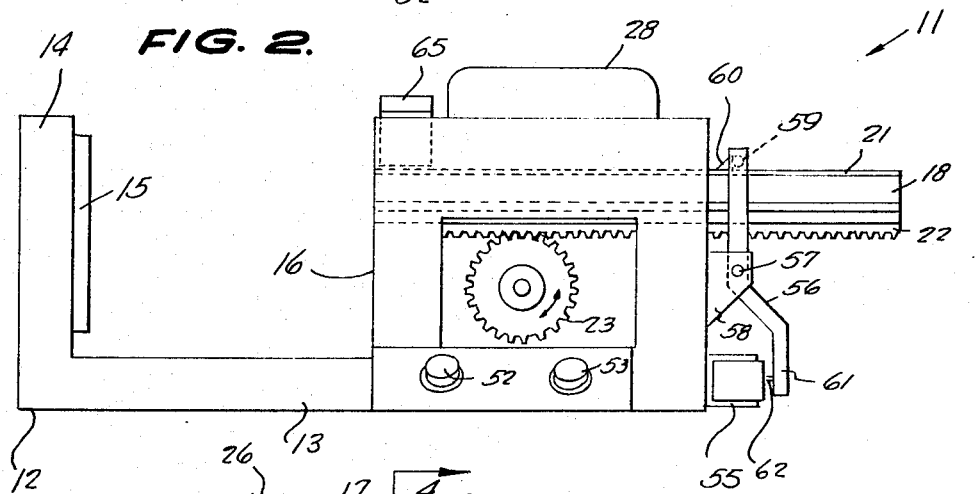
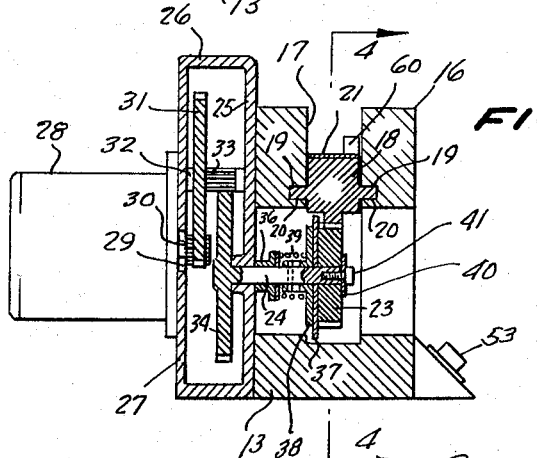
INVENTOR.
CLAYTON W. HAHN,
BY
*Berman, Davidson & Berman*
ATTORNEYS.

Oct. 4, 1966

C. W. HAHN 3,276,131

LINEAR MEASURING DEVICE

Filed April 9, 1965

INVENTOR.
CLAYTON W. HAHN,
BY
Berman, Davidson + Berman
ATTORNEYS.

United States Patent Office 3,276,131
Patented Oct. 4, 1966

3,276,131
LINEAR MEASURING DEVICE
Clayton W. Hahn, 1516 Sunrise Rim Road, Boise, Idaho
Filed Apr. 9, 1965, Ser. No. 446,941
3 Claims. (Cl. 33—147)

This invention relates to electrical micrometers, and more particularly to an electrical gauge device of the type employing a movable gauge bar having magnetically recorded pulses thereon cooperating with a stationary reproducing head.

A main object of the invention is to provide a novel and improved gauge device for quickly determining linear dimensions of workpieces or other objects, the gauge device being simple in construction, being easy to operate, and providing measurements of high precision.

A further object of the invention is to provide an improved electrical micrometer device of the type employing a movable gauge bar on which pulses have been magnetically recorded and cooperating with a stationary reproducer head, the device being relatively inexpensive to fabricate, being durable in construction, being reliable and accurate in operation, and involving a minimum number of moving parts.

A still further object of the invention is to provide an improved devise for use in making linear measurements by counting pulses which have been magnetically recorded on a movable gauge bar, the device having high resolution, being relatively unaffected by mechanical wear, being easy to read, and being protected against damage from careless use.

Further objects and advantages of the invention will become apparent from the following description and claims, and from the accompanying drawings, wherein:

FIGURE 1 is a top plan view of the calipering portion of a gauge device constructed in accordance with the present invention.

FIGURE 2 is a side elevational view of the calipering member of FIGURE 1.

FIGURE 3 is a transverse vertical cross-sectional view taken substantially on the line 3—3 of FIGURE 1.

Figure 4:
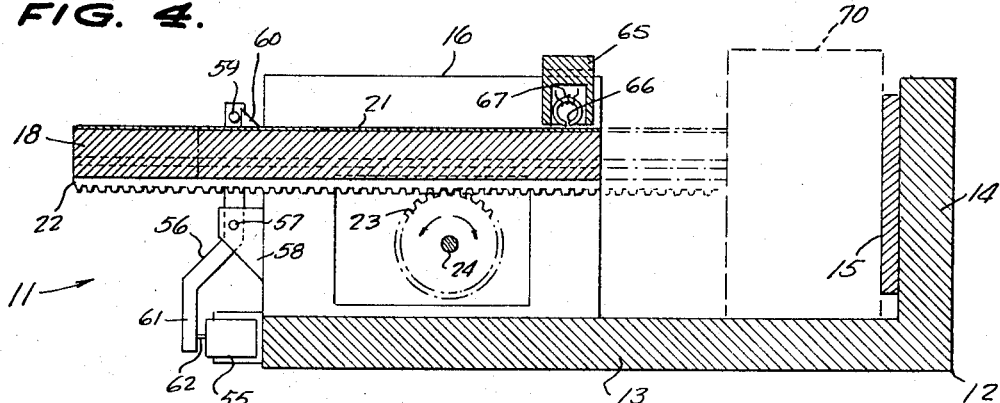
FIGURE 4 is a longitudinal vertical cross-sectional view taken substantially on the line 4—4 of FIGURE 3.

Referring to the drawings, 11 generally designates a gauging or calipering device constructed in accordance with the present invention. The device 11 comprises a main supporting frame 12 consisting of a horizontal base portion 13 provided at one end with an upstanding vertical anvil arm 14 on the inside surface of which is secured an anvil plate 15 of suitable durable material. Rigidly secured on the opposite end portion of the base member 13 is an upstanding block 16 formed with a longitudinal top groove 17 in which is slidably disposed a longitudinally-movable elongated gauging bar 18, said bar being formed at its opposite sides with longitudinal guide ribs 19, 19 which are slidably received in corresponding grooves or channels 20 provided in the inside vertical walls of the guide groove 17. Rigidly secured on the top surface of the gauge bar 18 is a magnetic tape 21 of magnetic metal or ferrite material on which uniformly-spaced pulses have been magnetically recorded, as will be presently described. The bottom of the gauge bar 18 is integrally-formed with a depending longitudinally-extending rack bar 22 whose teeth are meshingly engaged by a pinion gear 23 rotatably mounted on a transverse shaft 24 which is journaled in the inner vertical wall 25 of a gear box 26 secured to one side of the block 16.

Secured to the outer sidewall 27 of the gear box 26 is an electrical drive motor 28 whose shaft projects into the gear box 26 through an aperture 29 in the outer vertical wall 27 of the gear box, the motor shaft being provided with a drive pinion 30 which meshes with a large gear 31 mounted on a transverse shaft 32 journaled in the upper portion of gear box 26, as shown in FIGURE 3. Shaft 32 is provided with a reduced pinion gear 33 which meshes with a large gear 34 secured on the end of shaft 24, whereby the shaft of motor 28 is drivingly coupled to the shaft 24 through a speed-reducing gear train.

Shaft 24 is frictionally coupled to pinion gear 23 through a slip-clutch assembly. As shown in FIGURE 3, said assembly may comprise a collar element 36 secured to shaft 24 and frictionally coupled to pinion 23 through a friction disc 37 urged against pinion 23 by a flanged bushing 38 which is biased away from the drive collar 36 by a coil spring 39 interposed between the flanged bushing 38 and the driving collar 36, as shown in FIGURE 3. Pinion 23 is retained on shaft 24 by the provision of an end washer 40 and an axial fastening screw 41 threadedly engaged in the end of shaft 24 and securing the washer 40 to the end of the shaft.

Motor 28 is of the reversible type and is provided with a forward drive coil 42 and a reverse drive coil 43. Thus, when the coil 42 is energized, the motor 28 operates to drive the pinion gear 23 in a counterclockwise direction, as viewed in FIGURE 2, moving the gauge bar 18 to the left, namely, toward the anvil plate 15. When the winding 43 is energized, the motor operates to drive the pinion gear in a clockwise direction, as viewed in FIGURE 2, retracting the gauging bar 18 and moving it toward the normal position thereof shown in FIGURES 1 and 2. In each case, the pinion gear 23 is driven through the slip-clutch assembly above-described, the drive collar 36, the spring 39, the flanged bushing 38, and the friction disc 37.

Figure 6:
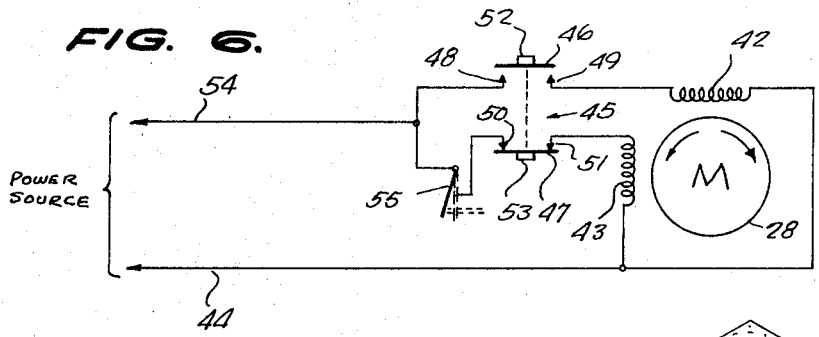
FIGURE 6 is an electrical wiring diagram showing the electrical connections of the elements employed in the calipering member of FIGURES 1 to 4.
Figure 7:
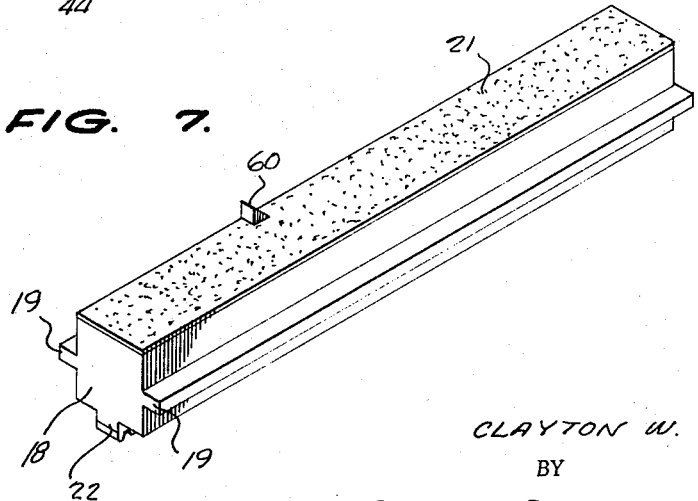
FIGURE 7 is an enlarged perspective view of the movable gauge bar assembly employed in the calipering device of FIGURES 1 to 4.

As shown in FIGURE 6, each of the coils 42 and 43 has one terminal thereof connected to a first supply wire 44. Designated at 45 is a conventional double-pole double-throw push button-switch assembly having the respective poles 46 and 47 which are mechanically interconnected, the pole 46 being bridgingly engageable with a pair of stationary contacts 48 and 49, and the pole 47 being bridgingly engageable with a pair of stationary contacts 50 and 51, the poles 46 and 47 being mechanically interconnected in such a manner that when pole 47 engages contacts 50, 51, the pole 46 is separated from the contacts 48, 49, and vice versa. Pole 46 is provided with the actuating push button 52 and pole 47 is provided with the actuating push button 53. The remaining terminal of the forward motor winding 42 is connected to a second line wire 54 through the contacts 49 and 48. The remaining terminal of the reverse motor winding 43 is connected to the line wire 54 through the contacts 51 and 50, and a snap switch 55. The snap switch 55 is of the normally-closed type, but is held open when the bar 18 is full retracted, namely, is in the position shown in FIGURES 1 and 2, by the action of a lever 56 pivoted at 57 to a bracket 58 secured to the rear side of block 16. The top end of the lever 56 is provided with a transversely-extending pin 59 which overlies the bar 18 and which is engageable by an upstanding triangular lug 60 mounted on said bar, the lug 60 being located so as to engage the pin 59 when the bar 18 is in its fully-retracted position. The lever 56 is provided with the rearwardly-offset bottom arm 61 which is engageable with the operating plunger 62 of the snap switch 55, said snap switch being mounted on the lower portion of the rear face of block 16, as shown in FIGURE 2. Thus, when the lug 60 engages the pin 59, the lever 56 is rotated in a clockwise direction, as viewed in FIGURE 2, causing the arm 61 to exert operating force on the plunger 62, whereby the snap switch 55 is opened, and is held open as long as gauging bar 18 is maintained in its retracted position. Snap switch 55 closes as soon as gauging bar 18 moves forwardly, namely, toward the anvil plate 15.

Thus, when the "forward" push button 52 is actuated, pole 46 bridges contacts 48 and 49, causing the "forward" motor winding 42 to become energized, whereby the motor drives the pinion gear 23 in a counterclockwise direction, as viewed in FIGURE 2, causing the bar 18 to be moved to the left, as viewed in FIGURE 2, until its further leftward movement is obstructed, for example, by the presence of an object interposed between the anvil plate 15 and the forward end of the bar. With the pole 46 in its closed position, namely, engaging the contacts 48 and 49, the motor 28 continues to be energized, but the shaft 24 rotates while the pinion gear 23 is held stationary because of the provision of the slip-clutch structure above-described. The bar 18 may be retracted by operating the "reverse" push button 53, causing pole 47 to bridgingly engage stationary contacts 50 and 51, while moving pole 46 out of engagement with respect to the opposite contacts 48, 49. When pole 47 engages the contacts 50, 51, the "reverse" winding 43 becomes energized, since the snap switch 55 is closed, whereby the bar 18 is retracted, namely, is moved to the right toward the normal position thereof shown in FIGURES 1 and 2. When the lug 60 engages the pin 59, the snap switch 55 is opened, restoring the parts to their normal conditions, namely, the conditions illustrated in full-line view in the drawings.

Mounted on the forward portion of block 16, overlying the groove 17 and spaced closely over the magnetic tape 21 is a magnetic pick-up head 65 having its air gap 66 located immediately adjacent to the path of the movement of the magnetizied portion of the tape 21 so as to respond to the pulses recorded thereon. Thus, corresponding signals are induced in the pick-up coil 67 of the head 65 when the bar 18 moves past the head 65, said signals corresponding to the pulses recorded on the magnetic tape 21. Thus, the head 65 generates a number of pulse signals corresponding to the amount of linear movement of the gauge bar 18 from its normal retracted position to its final position, for example, to the position at which further leftward movement thereof, as viewed in FIGURES 1 and 2, is blocked, in the manner above-described, by the presence of an object between the left end of the bar 18 and the anvil plate 15.

Figure 5:
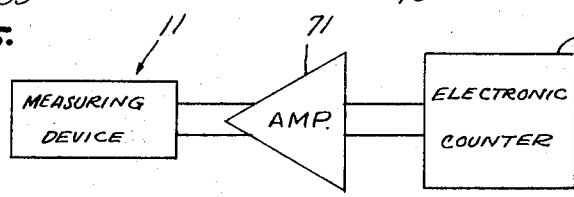
FIGURE 5 is a block diagram of the electrical system of a gauge apparatus according to the present invention.

Since the pulses recorded on the magnetic tape 21 are of a definite frequency and are recorded at a definite known speed of the tape, the exact number of pulses per linear inch of the tape is preciseuly known. Therefore, as an example, if one-thousand pulses per linear inch have been recorded on the tape 21, each pulse represents an increment of one-thousandth of an inch along the bar 18. In employing the gauge assembly 11, suitable means are provided for counting the pulses generated in the pick-up head 65 during a gauging movement of the bar 18 and employing this information to determine the physical dimension of an object, for example, the object 70, shown in dotted view in FIGURE 4, interposed between the forward end of the bar 18 when it is in engaging position and the anvil plate 15. Thus, as shown in FIGURE 5, the output of the pick-up head 65 is delivered through an amplifier 71 to a conventional electronic counter 72. The electronic counter 72 may be of any suitable type, for example, may be similar to the "Anadex Bi-Directional Counter" Model CF-400R, manufactured by Anadex Instruments, Inc., Van Nuys, California. This type of counter may be adjusted to either add or substract pulses from a given starting value, for example, from zero. Thus, the counter 72 may be preset to read zero when the forward end of the gauge bar 18 is in contact with the anvil plate 15 and to count the pulses generated by the movement of tape 21 past the recording head 65 when the bar 18 is retracted to the starting position, shown in full-line view in FIGURES 1, 2 and 4. In the starting position of the gauging device 11, the counter 72 will read a value corresponding to the distance between the forward end (the right end, as viewed in FIGURE 4) of bar 18 and the anvil plate 15. When the bar 18 is moved into engagement with an object 70 to be measured, the counter 72 subtracts pulses from its starting reading, finally giving a value corresponding to the distance in thousandths of an inch between the forward end of bar 18 and anvil plate 15 when further rightward movement of the gauge bar 18, as viewed in FIGURE 4, is prevented. Thus, assuming that the bar 18 has a permissible rightward movement, as viewed in FIGURE 4, of 4.1 inches, from the normal position thereof shown in full-line view to a position wherein it engages the anvil plate 15, and that the tape 21 carries one-thousandth pulses per inch recorded thereon, the initial reading of the counter in the starting position shown in full-line view of FIGURE 4 will be 4.100. When the forward winding 42 of the motor 28 is energized by actuating the push button 52, as above-described, the bar 18 is moved rightward from the position thereof shown in FIGURE 4 into engagement with an object 70 to be measured, and comes to rest in the dotted-view position thereof illustrated, namely, engaging the object 70. In moving rightward from the position shown in full-line view in FIGURE 4 to the dotted-view position thereof, the bar 18 generates a number of pulses in the pick-up head 65 corresponding to the number of thousandths of an inch of movement thereof rightward, and this number is substracted from the initial value indicated by the counter 72. The resultant value indicated by the counter is the thickness of the object 70.

Thus, it will be readily apparent that the limit of the smallest size increment of the unit measured is dependent upon the width of the air gap 66 of the magnetic pick-up head 65 and the limits of the pulse counting rate of the electronic counter 72 employed in conjunction with the gauging device 11. A further limitation is the speed with which the magnetically-recorded pulses pass the pick-up head, since the voltage output signals produced by the magnetically-recorded pulses are a function of such speed. To insure the measuring bar 18 moves with sufficient speed to generate measurable voltage signals, the forward end of the recording on the tape 21 may be spaced rearwardly from the pick-up head air gap 66 so that the gauge bar 18 is driven a short distance before the recorded pulses pass adjacent to the air gap 66, during which time the bar 18 is accelerated sufficiently to produce signals of adequate voltage.

As above-mentioned, the slip-clutch assembly provided between the shaft 24 and the pinion gear 23 allows the motor to transmit sufficient force to securely hold the gauging bar 18 against the object 70 to be measured without overloading the motor. Said slip-clutch arrangement also acts to prevent the measuring bar 18 from chattering or bouncing back when it engages the object 70, and thereby minimizes the possibilities of obtaining erroneous readings.

The gauging bar 18 may be made of any suitable rigid non-magnetic material, such as stainless or nickel steel, and the forward end of the measuring bar may be suitably formed to adapt the bar to the measurement of different contours. Thus, the forward end of the bar 18 may be spherical or of any other desired shape, as required for the objects to be measured. Thus, the gauging assembly 11 may be employed for the measurement of thickness of materials, diameters, hole depths, or the like.

As above-mentioned, the limit of the smallest size of increments of measurable dimensions depends upon the width of the reproducing head gap 66 and the limits of the pulse-counting rate of the electronic counter 72. In the specific example described above, the magnetic tape 21 is calibrated by pulses corresponding to increments of one-thousandths of an inch. Obviously, the tape 21 may be correspondingly calibrated in metric units, rather than in inch units.

It is further apparent that any suitable electronic counter means may be employed in conjunction with the apparatus, for example, the counter 72 may be of a type providing a printed record of each measurement, or may be adapted for use with automatically-controlled machine tools, providing automatic inspection of parts being produced.

While a specific embodiment of an improved electrically-operated gauging apparatus has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A gauging apparatus comprising a support, an elongated bar member slidably mounted on said support, a stationary anvil member on said support opposite one end of said bar member, magnetic means on said bar member magnetized with uniformly longitudinally-spaced signal pulses, stationary magnetic pick-up means on the support mounted adjacent the path of movement of said first-named magnetic means on developing signal pulses therein corresponding to said first-named signal pulses responsive to longitudinal movement of the bar member, pulse-counting means connected to said magnetic pick-up means, said bar member being formed with longitudinally-spaced rack teeth, a pinion gear journaled on said support meshingly engaging said rack teeth, a reversible electric motor mounted on said support and having a forward drive winding and a reverse drive winding, means to selectively energize said windings, means drivingly-connecting said motor to said bar member, normally-closed switch means in circuit with said reverse winding, said switch means being mounted on the support and being provided with a movable operating member, and means on said bar member drivingly-engageable with said operating member responsive to the movement of said bar member to a predetermined retracted position relative to said anvil member, whereby to open the switch means and de-energize said reverse winding when the bar member reaches said predetermined retracted position.

2. A gauging apparatus comprising a support, an elongated bar member slidably mounted on said support, a stationary anvil member on said support opposite one end of said bar member, magnetic means on said bar member magnetized with uniformly longitudinally-spaced signal pulses, stationary magnetic pick-up means on the support mounted adjacent the path of movement of said first-named magnetic means and developing signal pulses therein corresponding to said first-named signal pulses, responsive to longitudinal movement of the bar member, pulse-counting means connected to said magnetic pick-up means, a reversible electric motor mounted on said support and having a forward drive winding and a reverse drive winding, means to selectively energize said windings, means drivingly connecting said motor to said bar member, normally closed switch means in circuit with said reverse winding, said switch means having an operating element, a lever pivoted to said support and having a portion thereof engageable with said operating element, and means on said bar member drivingly-engageable with said lever to cause the lever to actuate said operating element responsive to the movement of said bar member to a predetermined retracted position relative to said anvil member, whereby to open said switch means and de-energize said reverse drive winding.

3. A gauging apparatus comprising a support, an elongated bar member slidably mounted on said support, a stationary anvil member on said support opposite one end of said bar member, magnetic means on said bar member magnetized with uniformly longitudinally-spaced signal pulses, stationary magnetic pick-up means on the support mounted adjacent the path of movement of said first-named magnetic means and developing signal pulses therein corresponding to said first-named signal pulses responsive to longitudinal movement of the bar member, pulse-counting means connected to said magnetic pick-up means, said bar member being formed with longitudinally-spaced rack teeth, a pinion gear journaled on said support meshingly engaging said rack teeth, a reversible electric motor mounted on said support and having a forward drive winding and a reverse drive winding, means to selectively energize said windings, means including a slip-clutch assembly drivingly connecting said motor to said pinion gear, normally closed switch means in circuit with said reverse winding, said switch means having an operating plunger, a lever pivoted to said support with one end portion thereof engageable with said operating plunger, a transversely-extending pin on the other end portion of the lever extending over said bar member, and a projection on said bar member drivingly-engageable with said pin to cause the lever to actuate said operating plunger responsive to the movement of said bar member to a predetermined retracted position relative to said anvil member, whereby to open said switch means and de-energize said reverse drive winding.

References Cited by the Examiner

UNITED STATES PATENTS

| 2,554,171 | 5/1951 | Brunot et al. | 33—172 |
| 2,933,816 | 4/1960 | Gunther | 33—164 |
| 3,060,584 | 10/1962 | Westfall | 33—143 |

FOREIGN PATENTS 791,902  3/1958  Great Britain.

LEONARD FORMAN, *Primary Examiner.*

SAMUEL S. MATTHEWS, *Assistant Examiner.*